(12) United States Patent
Kai

(10) Patent No.: US 6,956,521 B2
(45) Date of Patent: Oct. 18, 2005

(54) RADAR DEVICE FOR DETECTING A DISTANCE AND RELATIVE SPEED OF AN OBJECT

(75) Inventor: Koichi Kai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/408,447

(22) Filed: Apr. 8, 2003

(65) Prior Publication Data

US 2004/0051660 A1 Mar. 18, 2004

(30) Foreign Application Priority Data

Apr. 18, 2002 (JP) .............................. 2002-115662

(51) Int. Cl.⁷ .............................................. G01S 13/42
(52) U.S. Cl. ...................... 342/70; 342/109; 342/111; 342/192; 342/196
(58) Field of Search ........................... 342/70–72, 109, 342/111, 192, 195, 196

(56) References Cited

U.S. PATENT DOCUMENTS

| 5,361,072 A | 11/1994 | Barrick et al. |
| 5,517,196 A * | 5/1996 | Pakett et al. .................. 342/70 |
| 6,266,004 B1 * | 7/2001 | Pannert et al. ................ 342/70 |
| 2001/0015698 A1 * | 8/2001 | Tokoro ......................... 342/70 |

FOREIGN PATENT DOCUMENTS

| JP | H6-51055 A | 2/1994 |
| JP | 11-064499 | 3/1999 |
| JP | H11-326504 A | 11/1999 |
| JP | 2001-264426 A | 9/2001 |
| JP | 2002-90448 A | 3/2002 |

OTHER PUBLICATIONS

Official Action of the German Patent and Trademark Office.

* cited by examiner

Primary Examiner—Thomas H. Tarcza
Assistant Examiner—Isam Alsomiri
(74) Attorney, Agent, or Firm—Sughrue Mion, PLLC

(57) ABSTRACT

A radar device includes a mixer that mixes an output of a transmit antenna 4 and an input of a receive antenna 6, an LPF 8, an A/D converter 9 that samples an output signal of the LPF 8 and subjects the sampled signal to A/D conversion, an FFT processing device 10 that subjects the converted signal to high-speed Fourier transformation, an aliasing discriminating/correcting device that discriminates a signal having a frequency component where aliasing occurs from a result by the FFT processing device 10 and corrects the signal to a signal of a normal frequency component where no aliasing occurs to obtain a distance and relative velocity data of the object, and a target object selecting device that selects necessary data from the distance and relative velocity data of the object which are obtained from the aliasing discriminating/correcting means.

4 Claims, 8 Drawing Sheets

SPECTRUM OF BEAT SIGNAL WHEN TRANSMIT FREQUENCY COMES UP

SPECTRUM OF BEAT SIGNAL WHEN TRANSMIT FREQUENCY COMES DOWN

SPECTRUM OF BEAT SIGNAL WHEN TRANSMIT FREQUENCY COMES UP

SPECTRUM OF BEAT SIGNAL WHEN TRANSMIT FREQUENCY COMES DOWN

DISTANCE R

SPECTRUM OF BEAT SIGNAL
WHEN TRANSMIT FREQUENCY
COMES UP

SPECTRUM OF BEAT SIGNAL
WHEN TRANSMIT FREQUENCY
COMES DOWN

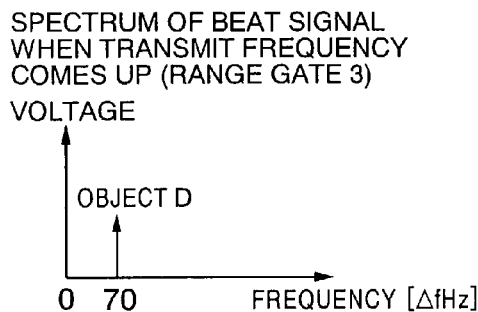

FIG.9A

SPECTRUM OF BEAT SIGNAL WHEN TRANSMIT FREQUENCY COMES UP (RANGE GATE 3)

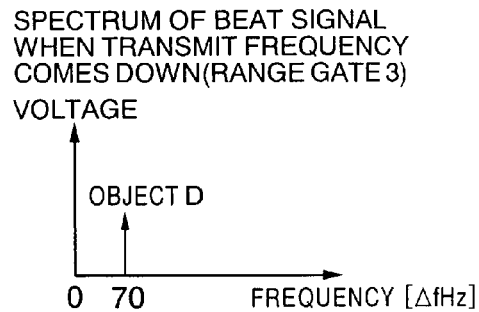

FIG.9B

SPECTRUM OF BEAT SIGNAL WHEN TRANSMIT FREQUENCY COMES DOWN (RANGE GATE 3)

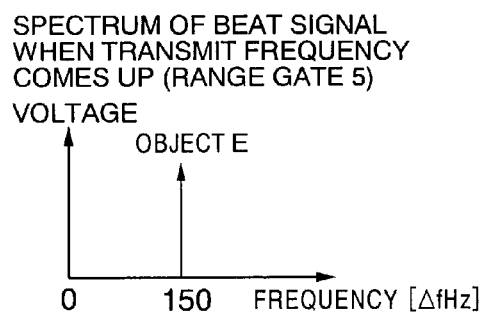

FIG.9C

SPECTRUM OF BEAT SIGNAL WHEN TRANSMIT FREQUENCY COMES UP (RANGE GATE 5)

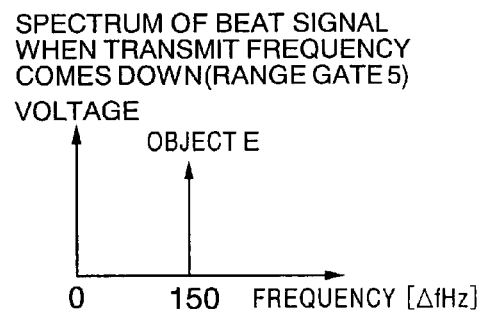

FIG.9D

SPECTRUM OF BEAT SIGNAL WHEN TRANSMIT FREQUENCY COMES DOWN (RANGE GATE 5)

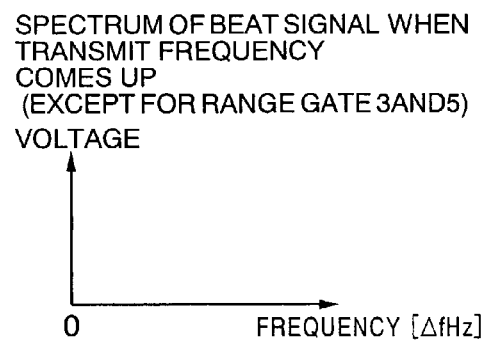

FIG.9E

SPECTRUM OF BEAT SIGNAL WHEN TRANSMIT FREQUENCY COMES UP (EXCEPT FOR RANGE GATE 3 AND 5)

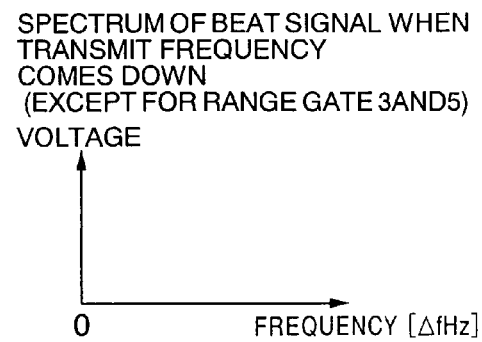

FIG.9F

SPECTRUM OF BEAT SIGNAL WHEN TRANSMIT FREQUENCY COMES DOWN (EXCEPT FOR RANGE GATE 3 AND 5)

RADAR DEVICE FOR DETECTING A DISTANCE AND RELATIVE SPEED OF AN OBJECT

BACKGROUND OF THE INVENTION

1. Field of the Invention

The present invention relates to a radar device, and more particularly to a vehicle-mounted radar device which is mounted on a vehicle such as an automobile and receives a transmitted electromagnetic wave which has been reflected by an object to detect a distance to the object and a relative speed of the object.

2. Description of the Related Art

In a vehicle such as an automobile, a vehicle-mounted radar device is employed in order to measure a relative speed and a relative distance with respect to a preceding vehicle or the like. As a conventional vehicle-mounted radar device, there has been known, for example, a structure shown in FIG. 11. In FIG. 11, reference numeral 41 denotes a modulator, 42 is a voltage control transmitter, 43 is a power divider, 44 is an transmit antenna, 45 is a target object, 46 is a receive antenna, 47 is a mixer, 48 is a low-pass filter (hereinafter referred to as "LPF"), 49 is an A/D converter, 50 is an FFT processing device and 51 is a signal processing device.

Subsequently, the operation of a conventional device thus structured will be described. The modulator 41 outputs a linear voltage signal for FM modulation. The voltage control transmitter 42 generates an electromagnetic wave that has been subjected to FM modulation in accordance with the FM modulation voltage signal. The electromagnetic wave is divided into two waves by the power divider 43 and one of those waves is inputted to the mixer 47. Another wave is outputted to a space from the transmit antenna 44. The electromagnetic wave that has been outputted to the space from the transmit antenna 44 is reflected by the target object 45 and then inputted to the receive antenna 46 with a delay time Td[S] with respect to the transmit electromagnetic wave. In addition, in the case where the target object 45 has a relative speed, the receive electromagnetic wave is inputted to the receive antenna 46 with a Doppler shift Fd [Hz] with respect to the transmit electromagnetic wave. The electromagnetic wave that has been received by the receive antenna 46 is mixed with the transmit electromagnetic wave that has been inputted by the power divider 43 by the mixer 47 to output a beat signal corresponding to the delay time Td and the Doppler shift Fd. The LPF 48 is so structured as to make a signal having a frequency component of the half or less of the sampling frequency Fs of the A/D converter 49 pass therethrough. The A/D converter 49 samples the beat signal that has passed through the LPF 48 at a sampling frequency Fs [Hz]. The FFT processing device 50 subjects the beat signal that has been sampled by the A/D converter 49 to high-speed Fourier transformation (FFT) to output the frequency component of the beat signal. The signal processing device 51 calculates the relative distance to the target object 45 and the relative speed of the target object 45 in accordance with the frequency component that has been outputted from the FFT processing device 50.

Subsequently, a method of calculating the relative distance and the relative speed by the signal processing device 11 will be described. FIG. 12 is an example in which the relative distance and the relative speed are calculated by using the radar device. In FIG. 12, a transmit electromagnetic wave is FM-modulated at the frequency is FM-modulated at the frequency sweep band width B of the transmit electromagnetic wave and the modulation period Tm. The receive electromagnetic wave has a delay time Td required until the transmit electromagnetic wave is reflected by the target object 45 that is apart from the transmit antenna 44 by a distance R and is then inputted to the receive antenna 46. Also, when the target object 45 has the relative speed, the receive electromagnetic wave is Doppler-shifted by Fd with respect to the transmit electromagnetic wave. Therefore, a frequency difference Fbu between the transmit signal and the receive signal is contained in the frequency components included in the beat signal that has been mixed by the mixer 47 when the frequency comes up and a frequency and a frequency difference Fbd between the transmit signal and the receive signal is contained in the frequency component when the frequency comes down. The relative distance R and the relative velocity v with respect to the target object 45 is found by the above Fbu, Fbd, Tm, B, a light velocity C ($3.0 \times 10^8$ m/s) and the wavelength $\lambda$ of a carrier wave ($\lambda = 5.0 \times 10^{-3}$ m if a fundamental frequency of the carrier is Fo=60 GHz) from the following expression (1).

$$R = (TmC/8B) \times (Fbu + Fbd)$$

$$v = (\lambda/4) \times (Fbu - Fbd) \tag{1}$$

Subsequently, the high-speed Fourier transformation of the FFT processing device 49 will be described. Normally, the high-speed Fourier transformation inputs the sampling data of $2^n$ FFT points and outputs $2^n$ frequency component data. When an observation time is Tm/2, a frequency resolution is represented by the following expression (2).

$$\Delta F = 2/Tm \tag{2}$$

A maximum frequency Fmax that can be detected with precision is represented by the following expression (3).

$$Fmax = 2^{n-1} \times \Delta F = 2^{n-1} \times 2/Tm \tag{3}$$

When a frequency component that is equal to or higher than the above maximum frequency Fmax is inputted to the high-speed Fourier transformation, aliasing occurs, and a virtual frequency component caused by returning at the frequency Fmax appears as shown in FIG. 2. In order to prevent the virtual frequency component caused by the aliasing, the LPF 48 is located upstream of the input of the FFT processing device 49 so as to cut the frequency components that are equal to or higher than Fmax.

Subsequently, it is assumed that the resolutions of the relative distance R and the relative velocity v (the minimum steps of data values that are outputted discretely) are $\Delta R$ and $\Delta v$, respectively. The resolutions $\Delta F$ of the frequency differences Fbu and Fbd become the above frequency resolutions 2/Tm, and $\Delta R$ and $\Delta v$ are represented by the following expressions.

$$\Delta R = (TmC/8B) \times (\Delta F + \Delta F) = (TmC/8B) \times (4/Tm) = C/2B \tag{4}$$

$$\Delta v = (\lambda/4) \times (\Delta F + \Delta F) = (\lambda/4) \times (4/Tm) = \lambda/Tm \tag{5}$$

In the case where a radar of, for example, the distance resolution $\Delta R = 1$ [m] and the maximum detection distance Rmax= 150 [m] is designed, a necessary modulation width B requires the following modulation width from the above-mentioned expression (4)

$$B = C/2/\Delta R = 150 \text{ [MHz]}$$

And the FFT points require $2^n = 512$ points that satisfy the following condition.

$$2^n \geq \Delta R \times Rmax \times 2 = 300$$

Also, assuming that the velocity resolution $\Delta v=1$ [km/h], the modulation period Tm requires the following condition.

$$Tm=\lambda/\Delta v=5.0\times10^{-3}\times3.6=18\times10^{-3} \ [S]$$

When the object of the distance 150 m and the relative velocity 0 km/h is detected, both of the frequency differences Fbu and Fbd are represented by the following expression.

$$Fbu=Fbd=\Delta F\times150/\Delta R=\Delta F\times150$$

However, when the object of the distance 150 m and the relative velocity 200 km/h is detected, the frequency differences Fbu and Fbd are represented by the following expressions, respectively.

$$Fbu=|\Delta F\times150/\Delta R+\Delta F\times200/\Delta R|=\Delta F\times350$$

$$Fbd=|\Delta F\times150/\Delta R-\Delta F\times200/\Delta v|=\Delta F\times50$$

When the FFT point is 512, the maximum frequency Fmax is represented by the following expression.

$$Fmax=\Delta F\times256$$

And a frequency component that is equal to or higher than the maximum frequency cannot be normally detected. For that reason, the frequencies that are equal to or higher than Fmax are cut by the LPF 48. Therefore, $Fbu=\Delta F\times350$ is cut by the LPF 48 and cannot be detected.

In order to solve the above problem, there is proposed that the resolution of the distance resolution $\Delta R$ or the relative velocity resolution $\Delta v$ is made coarse. For example, when $\Delta R=1.5$ m, $\Delta v=1.5$ km/h, then $Fbu=\Delta F\times175$, and the LPF 48 allows the frequency components of $Fmax'=Fmax\times1.5$ or lower to pass therethrough, to thereby enable the detection.

Alternatively, $\Delta R$ and $\Delta v$ are not changed as they are and the FFT point increases to 1024 point, and the LPF 48 allows the frequency component of $Fmax''=Fmax\times2$ to pass therethrough, to thereby enable the detection.

However, the coarse resolution leads to the deterioration of the radar performance, an increase in the FFT point leads to a great increase in the calculation volume and a storage device, resulting in a serious problem from the viewpoints of the costs.

SUMMARY OF THE INVENTION

The present invention has been made in order to solve the above-mentioned problems with the related art, and therefore an object of the present invention is to provide a radar device that is capable of accurately detecting even a target object where aliasing occurs.

With the above object in view, the radar device of the present invention comprises: a transmitting means for transmitting an electromagnetic wave to a target object; a receiving means for receiving the electromagnetic wave that is transmitted from said transmitting means and reflected by the target object; a mixing means for mixing an output of said transmitting means and an input of said receiving means to generate a beat signal; a low-pass filter that allows a signal having a frequency component that is equal to or lower than a given frequency among the beat signals outputted from said mixing means to pass therethrough; an A/D converting means for sampling an output signal of said low pass filter to convert the sampling signal into a digital signal; a high-speed Fourier transforming means for subjecting the sampling signal that is sampled by said A/D converting means and converted into the digital signal to high-speed Fourier transformation; an aliasing discriminating/correcting means for discriminating a signal having a frequency component where aliasing occurs from the high-speed Fourier transformation result by said high-speed Fourier transformation processing means and for correcting the signal where aliasing occurs to a signal of a normal frequency component having no aliasing to obtain a distance and relative velocity data of the object on the basis of the corrected signal or the signal where no aliasing occurs; and a target object selecting means for selecting necessary data from the distance and relative velocity data of the object which are obtained by said aliasing discriminating/correcting means.

BRIEF DESCRIPTION OF THE DRAWINGS

In the accompanying drawings:

FIGS. 9A to 9F are explanatory diagrams showing an FFT result when two objects are detected in accordance with the second embodiment of the present invention, respectively;

DETAILED DESCRIPTION OF THE PREFERRED EMBODIMENTS

Now, a description will be given in more detail of preferred embodiments of the present invention with reference to the accompanying drawings.

(First Embodiment)

Figure 1:
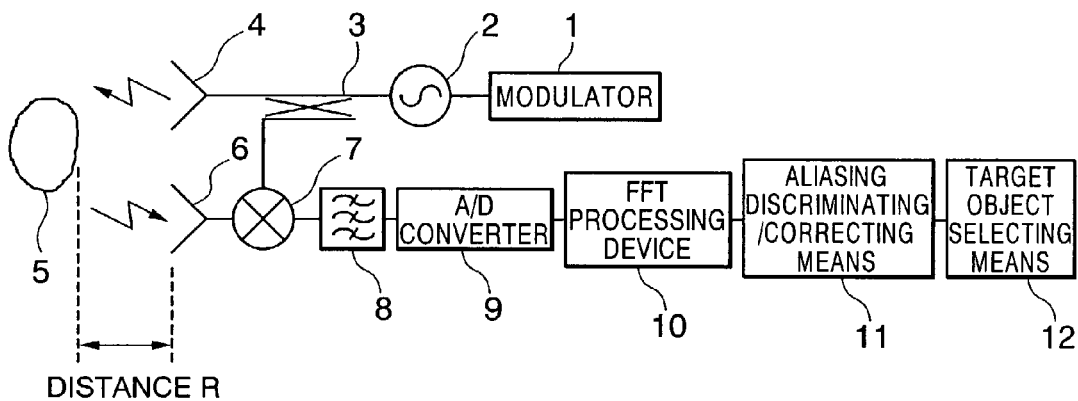
FIG. 1 is a block diagram showing the structure of a vehicle-mounted radar device in accordance with a first embodiment of the present invention.

FIG. 1 shows a vehicle-mounted radar device in accordance with an embodiment of the present invention, and in FIG. 1, reference numeral 1 denotes a modulator; 2 is a voltage control transmitter; 3 is a power divider; 4 is a transmit antenna; 5 is a target object; 6 is a receive antenna; 7 is a mixer; 8 is an LPF; 9 is an A/D converter; 10 is an FFT processing device; 11 is an aliasing discriminating/correcting means; and 12 is a target object selecting means.

Figure 2:
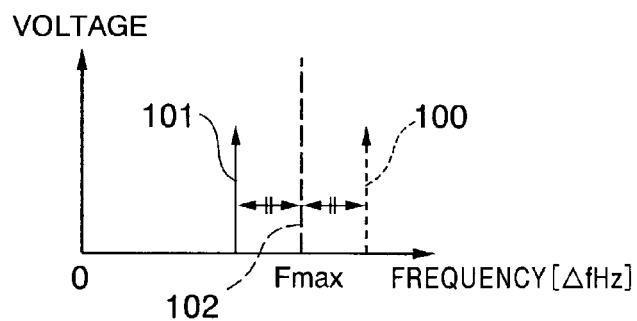
FIG. 2 is an explanatory diagram showing the occurrence of aliasing in accordance with the first embodiment of the present invention.

Subsequently, the operation of the vehicle-mounted radar device thus structured in accordance with this embodiment will be described. The modulator 1 outputs a linear voltage signal for FM modulation. The voltage control transmitter 2 generates an electromagnetic wave that has been subjected to FM modulation in accordance with the FM modulation voltage signal. The electromagnetic wave is divided into two waves by the power divider 3, one of which is inputted to the mixer 7. The other electromagnetic wave is outputted into a space from the transmit antenna 4. The electromagnetic wave that has been outputted from the transmit antenna 4 is reflected by the target object 5 and then inputted to the receive antenna 6 with a delay time Td [S] with respect to the transmit electromagnetic wave. In addition, in the case where the target object 5 has a relative velocity, the receive electromagnetic wave is inputted to the receive antenna 6 with a Doppler shift Fd [Hz] with respect to the transmit electromagnetic wave. The electromagnetic wave that has been received by the receive antenna 6 is mixed with the transmit electromagnetic wave that has been inputted from the power divider 3 in the mixer 7, and then outputs a beat signal corresponding to the delay time Td and the Doppler shift Fd. Then, the LPF 8 allows only a signal having the frequency component that is equal to or lower than the sampling frequency Fs of the A/D converter 9 to pass therethrough. The A/D converter 9 samples the beat signal that has passed through the LPF 8 at the sampling frequency Fs [Hz]. The FFT processing device 10 conducts the high-speed Fourier transformation (FFT) on the beat signal that has been sampled by the A/D converter 9 to output the frequency component of the beat signal. The aliasing discriminating/correcting means 11 detects data where aliasing occurs among the frequency component of the beat signal, and outputs a distance and a relative velocity resulting from correcting the detected data to correct data having no aliasing. FIG. 2 is a diagram for explaining the occurrence of aliasing, and in FIG. 2, reference numeral 100 denotes a frequency component in the case where there is no aliasing; 101 is a virtual frequency component; and 102 is a given maximum frequency Fmax. The frequency component that is equal to or higher than Fmax comes to a virtual frequency component 101 due to aliasing. For that reason, in the present invention, the aliasing discriminating/correcting means 11 converts that frequency component to a correct frequency component 100 in the case where there is no aliasing. The correct frequency component 100 is a value at which the virtual frequency component 101 is returned at Fmax. The target object selecting means 12 selects the target object necessary for a self-vehicle on the basis of a plurality of distance and relative velocity data that has been corrected by the aliasing discriminating/correcting means 11, a self-vehicle velocity, a road curvature and so on (that is, which satisfies given conditions related to those data).

Subsequently, the principle of the aliasing discriminating/correcting means 11 in the vehicle-mounted radar device thus structured in accordance with the present invention will be described. In the case where a radar of, for example, the distance resolution $\Delta R=1$ [m] and the maximum detection distance Rmax=150 [m] is designed, the necessary modulation width B requires the following modulation width from the above-mentioned expression (2).

$$B=C/2/\Delta R=150 \text{ [MHz]}$$

And the FFT point requires 512 points that satisfy the following condition.

$$2^n > \Delta R \times Rmax \times 2 = 300$$

Also, when the velocity resolution $\Delta v=1$ [km/h], the modulation period Tm requires the following value.

$$Tm=\lambda/\Delta v=5.0\times10^{-3}\times3.6=18\times10^{-3} \text{ [S]}$$

Figure 3A:
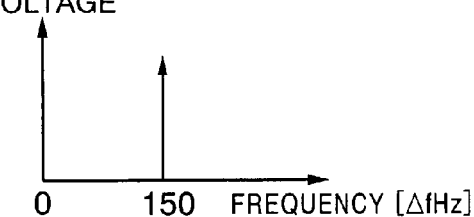
FIGS. 3A and 3B are explanatory diagrams showing an FFT processing result when an object of a distance 150 m and a relative velocity 0 km/h is detected in accordance with the first embodiment of the present invention, respectively.
Figure 3B:
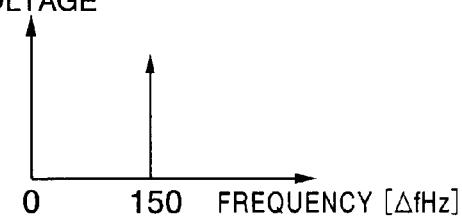

When an object A that is 150 m in distance and 0 km/h in relative velocity is detected, both of the frequency differences Fbu (when the transmit frequency comes up) and Fbd (when the transmit frequency comes down) are represented by the following expression as shown in FIGS. 3A and 3B.

$$Fbu=Fbd=\Delta F\times150/\Delta R=\Delta F\times150$$

Figure 4A:
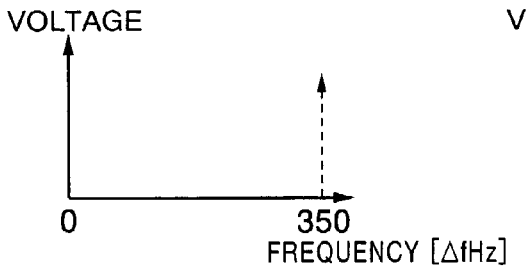
FIGS. 4A and 4B are explanatory diagrams showing an FFT processing result which does not take aliasing into consideration when an object of a distance 150 m and a relative velocity 200 km/h is detected in accordance with the first embodiment of the present invention, respectively.
Figure 4B:
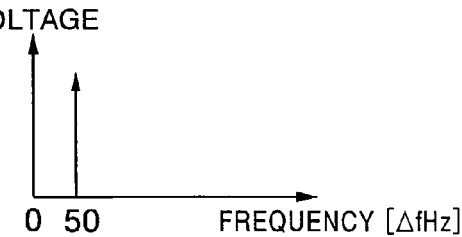

However, in the case where an object B that is 150 m in distance and 200 km/h in relative velocity is detected, the frequency differences Fbu and Fbd are represented as follows as shown in FIGS. 4A and 4B.

$$Fbu=|\Delta F\times150/\Delta R+\Delta F\times200/\Delta v|=\Delta F\times350$$

$$Fbd=|\Delta F\times150/\Delta R-\Delta F\times200/\Delta v|=\Delta F\times50$$

Because the LPF 8 allows a band of the sampling frequency Fs or lower to pass therethrough, Both of Fbu and Fbd are not cut by the LPF 8.

In this case, when the FFT point is 512, the maximum frequency Fmax is represented as follows:

$$Fmax=256\therefore\Delta F$$

Figure 5A:
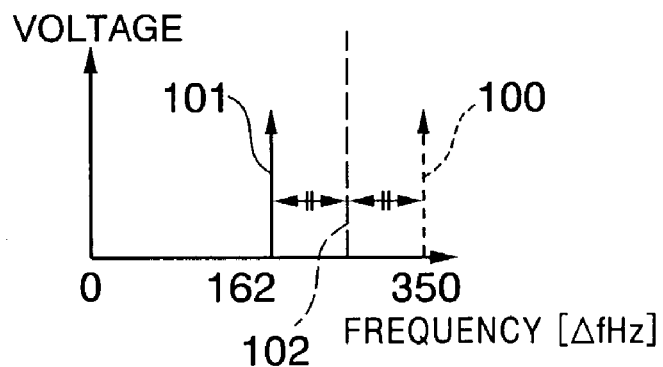
FIGS. 5A and 5B are explanatory diagrams showing an FFT processing result which takes aliasing into consideration when an object of a distance 150 m and a relative velocity 200 km/h is detected in accordance with the first embodiment of the present invention, respectively.
Figure 5B:
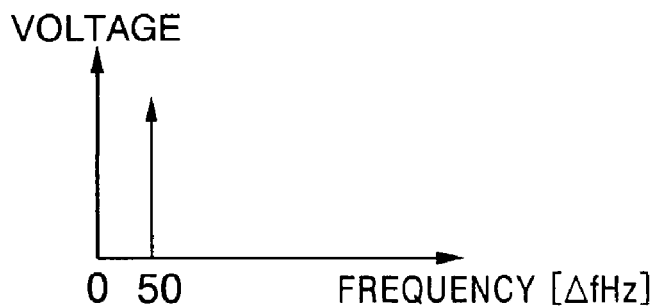

Therefore, Fmax is returned at Fmax as shown in FIGS. FIGS. 5A and 5B, and Fbu and Fbd are represented as follows:

$$Fbu=\Delta F\times162$$

$$Fbd=\Delta F\times50$$

Incidentally, when an object C that is 106 m in distance and 56 km/h in relative velocity is detected, the frequency differences Fbu and Fbd are represented as follows:

$$Fbu=|\Delta F\times106/\Delta R+\Delta F\times56/\Delta v|=\Delta F\times162$$

$$Fbd=|\Delta F\times106/\Delta R-\Delta F\times56/\Delta v|=\Delta F\times50$$

And the object C is detected in the same manner as that of the object B which is 150 m in distance and 200 km/h in relative velocity.

The object B that is 150 m in distance and 200 km/h in relative velocity and the object C that is 106 m in distance and 56 km/h in relative velocity are completely identical with each other in the frequency components Fbu and Fbd of the beat signal as described above, but because the objects B and C are different in relative velocity from each other, a change in Fbu and Fbd with time is different from each other.

When the relative velocity is kept constant, a distance of the object B that is 150 m in distance and 200 km/h in relative velocity after 0.1 seconds becomes 144 m, and Fbu and Fbd are represented by the following expressions.

$$Fbu=|\Delta F\times144/\Delta R+\Delta F\times200/\Delta v|=\Delta F\times344$$

$$Fbd=|\Delta F\times144/\Delta R-\Delta F\times200/\Delta v|=\Delta F\times56$$

When correction is made taking aliasing into consideration, Fbu and Fbd are represented as follows:

$$Fbu = \Delta F \times 168$$

$$Fbd = \Delta F \times 56$$

A variation in Fbu and Fbd for 0.1 seconds becomes $\Delta F \times 6$.

On the other hand, a distance of the object C that is 106 m in distance and 56 km/h in relative velocity after 0.1 seconds becomes 108 m, and Fbu and Fbd are represented by the following expressions.

$$Fbu = |\Delta F \times 108/\Delta R + \Delta F \times 56/\Delta v| = \Delta F \times 164$$

$$Fbd = |\Delta F \times 108/\Delta R - \Delta F \times 56/\Delta v| = \Delta F \times 52$$

A variation in Fbu and Fbd for 0.1 seconds becomes $\Delta F \times 2$.

The aliasing discriminating/correcting means 11 thus observes the variation in Fbu and Fbd with time and can resultantly discriminate whether the obtained Fbu and Fbd is the object B or the object C.

Figure 6:
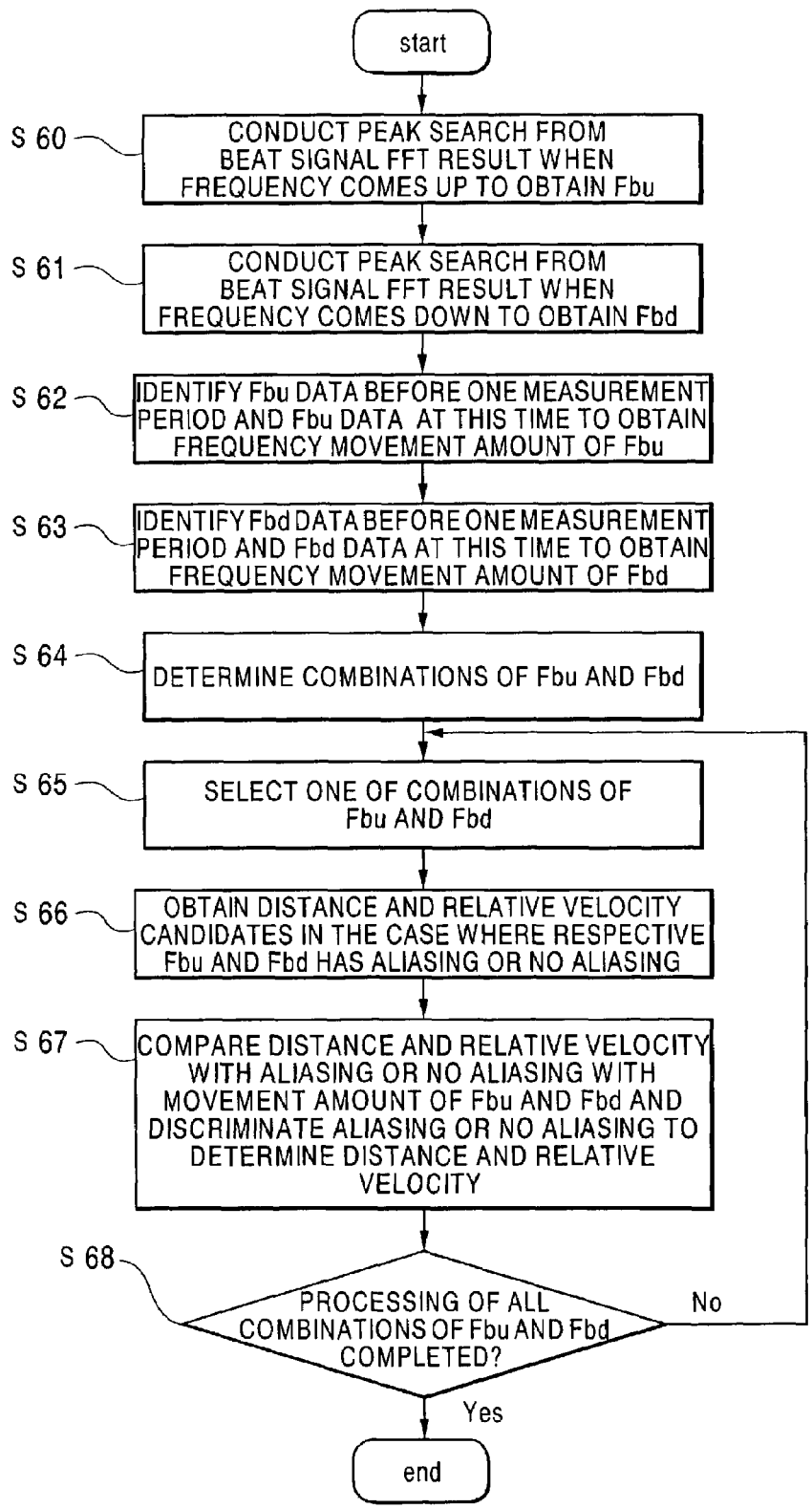
FIG. 6 is a flowchart showing the processing contents of an aliasing discriminating/correcting means in accordance with the first embodiment of the present invention.

FIG. 6 is a flowchart showing the processing contents of the aliasing discriminating/correcting means 11 in the vehicle-mounted radar device thus structured in accordance with the present invention. First, in step S60, peak search is conducted on the basis of the FFT result of the beat signal when the frequency comes up to obtain Fbu. A plurality of Fbu may be provided. Likewise, in step S61, peak search is conducted on the basis of the FFT result of the beat signal when the frequency comes down to obtain Fbd. A plurality of Fbd may be provided. Then, there is identified in step S62 the correspondence of a plurality of Fbu data obtained in step S60 to a plurality of Fbu data obtained in step S60 before one processing period, respectively, to thereby obtain a variation in frequency with time on the basis of the identification of Fbu before one processing period and the present Fbu. Likewise, there is identified in step S63 the correspondence of a plurality of Fbd data obtained in step S61 to a plurality of Fbd data obtained in step S61 before one processing period, respectively, to thereby obtain a variation in frequency with time on the basis of the identification of Fbd before one processing period and the present Fbd.

Subsequently, the combinations of the plurality of Fbu and Fbd are determined in step S64. Then, one of the combinations of Fbu and Fbd is selected in step S65. Then, four kinds of distance/relative velocity candidates in which each of Fbu and Fbd has aliasing or no aliasing, respectively, are obtained in step S66. Then, in step S67, the correct distance and relative velocity are obtained on the basis of the four kinds of distance and relative velocity candidates of the cases in which there is aliasing or no aliasing which is obtained in step S66 and the changes in the frequency of Fbu and Fbd with time which are obtained in steps S62 and S63. Then, in step S68, processing is completed if the distance and the relative velocity are obtained with respect to all the combinations of Fbu and Fbd, but returned to step S65 if not.

As described above, the conventional device uses the LPF 48 that allows the frequencies which are the half or lower of the sampling frequency Fs to pass therethrough in order to remove the virtual frequency component caused by aliasing. On the other hand, the radar device according to this embodiment is structured as described above and uses the LPF 8 that allows the frequencies which is equal to or lower than the sampling frequency Fs to pass there through and intentionally utilizes even the frequency component where aliasing may occur with correction, thereby being capable of broadening the detection distance and detection relative velocity ranges with respect to the target object by the same calculation volume as compared with the conventional device.

The present invention is not limited to this case, but the vehicle-mounted radar device with the same detection distance range and detection relative velocity range may be provided by using the LPF that allows the frequency that is the half or lower of Fs to pass therethrough as in the conventional device, and in this case, the calculation volume can be lessened.

Also, it is apparent that aliasing can be discriminated and corrected in the same manner even if the LPF 8 that allows the frequency which is equal to or higher than the sampling frequency Fs to pass therethrough is used.

In this embodiment, since the aliasing discriminating/correcting means 31 obtains the candidates of the distance and the relative velocity from the FFT calculation result, obtains a variation of the FFT calculation result with time in discriminating the correct candidate from the candidates and discriminates the correct candidate on the basis of a value of the variation with the time, an incorrect candidate can be prevented from being selected, thereby being capable of correctly detecting the distance and the relative velocity.

(Second Embodiment)

Figure 7:
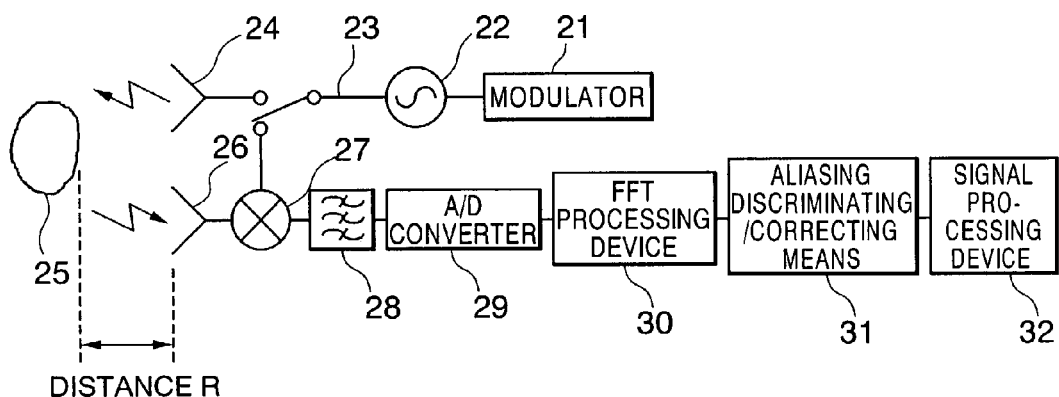
FIG. 7 is a block diagram showing the structure of a vehicle-mounted radar device in accordance with a second embodiment of the present invention.

FIG. 7 shows a vehicle-mounted radar device of the FM pulse Doppler system in which a pulse modulating function is added to the vehicle-mounted radar device according to the first embodiment. Referring to FIG. 7, reference numeral 21 denotes a modulator; 22 is a voltage control transmitter; 23 is a transmit/receive change-over switch for changing over an electromagnetic wave power of the voltage control transmitter 2 to a transmit antenna 24 or a receive side mixer 27; 24 is the transmit antenna; 25 is a target object; 26 is a receive antenna; 27 is the mixer; 28 is an LPF; 29 is an A/D converter; 30 is an FFT processing device; 31 is an aliasing discriminating/correcting device; and 32 is a signal processing device. What are different from the structure shown in FIG. 1 resides in that the power divider 3 is disposed in FIG. 1 whereas the transmit/receive change-over switch 23 is disposed in FIG. 7.

The electromagnetic wave transmitting operation of the vehicle-mounted radar device thus structured will be described. The modulator 21 outputs a linear voltage signal for FM modulation. The voltage control transmitter 22 outputs an electromagnetic wave that has been subjected to FM modulation in accordance with the EM modulation voltage signal. The electromagnetic wave is outputted into a space from the transmit antenna 24 by the transmit/receive change-over switch 23.

Figure 10:
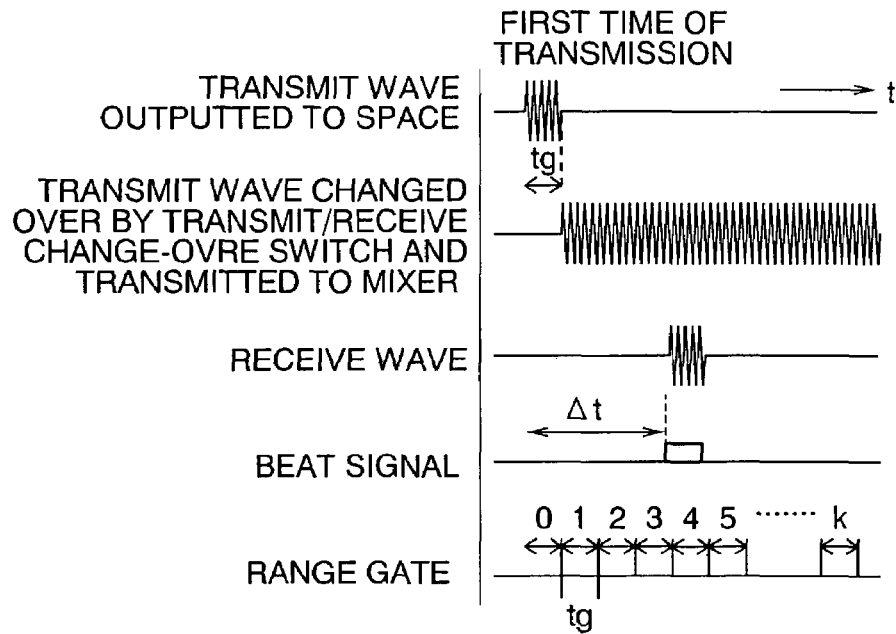
FIG. 10 is an explanatory diagram showing the operation of a transmit/receive change-over switch in accordance with the second embodiment of the present invention.
Figure 11:
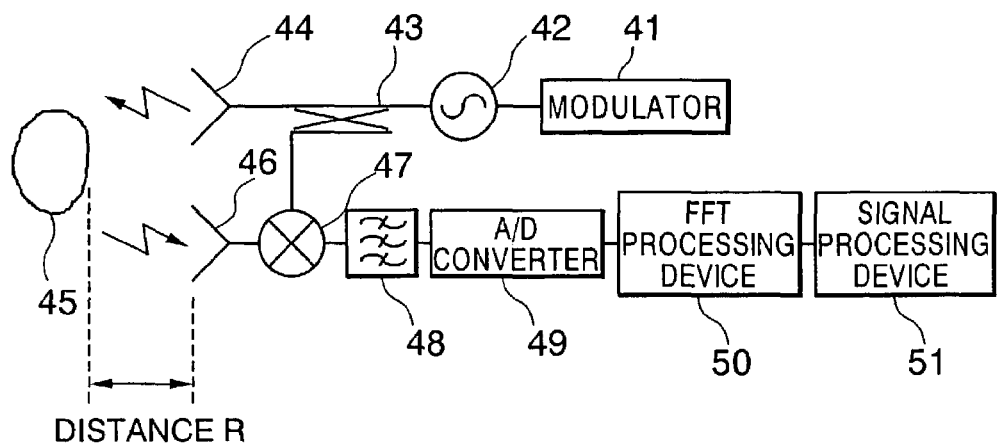
FIG. 11 is a block diagram showing the structure of a conventional vehicle-mounted radar device.
Figure 12:
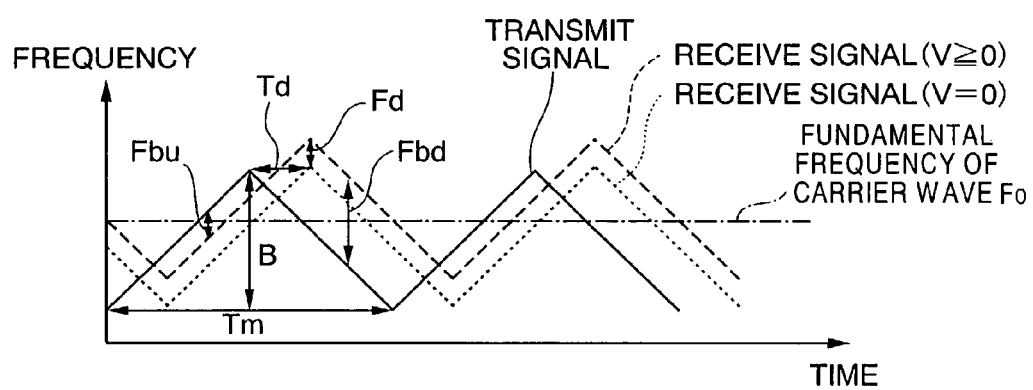
FIG. 12 is an explanatory diagram showing a method of calculating a relative distance and a relative velocity in the conventional vehicle-mounted radar device.

Subsequently, the electromagnetic wave receiving operation will be described. At a time point where a pulse time width tg, for example, 200 ns (=1/(5 MHz), corresponding to distance 30×2 m) elapses since the transmission of the electromagnetic wave starts, the transmit/receive change-over switch 23 changes over to the receive side to connect the voltage control transmitter 22 and the mixer 27 together. Also, the electromagnetic wave that has been outputted from the transmit antenna 24 into the space becomes a pulse waver that is outputted by 200 ns, is reflected by the target object 25 that exists at the distance R and is then inputted to the receive antenna 26 with the time delay $\Delta t$ which depends on the distance R with respect to the transmit electromagnetic wave. When the target object 25 has the relative velocity, the receive electromagnetic wave frequency is Doppler-shifted by fb with respect to the transmit electromagnetic frequency and then inputted to the receive antenna 26. The electromagnetic wave that has been inputted at the receive antenna 26 is mixed with the transmit electromagnetic wave from the voltage control transmitter 22 and outputs the beat signal. The obtained beat signal passes through the filter 28 which is 5 MHz in cutoff frequency, is inputted to the A/D converter 29 and is then converted into a digital signal every range gate, for example, in a period of 5 MHz as shown in FIG. 10. The output data of the A/D converter 29 generates the frequency component caused by the electromagnetic wave that has been reflected by the target object 25 only by a range gate No. k corresponding to the target object 25. A distance Rg of the target object 25 is calculated from the range gate No. k through the following expression (6).

$$Rg=(tg \times k \times C)/2 \qquad (6)$$

where C is a light velocity. The distance resolution corresponds to the pulse time width tg, and for example, if tg=200 ns, the distance resolution is 30 m. This is called "range gate width".

Figure 8A:
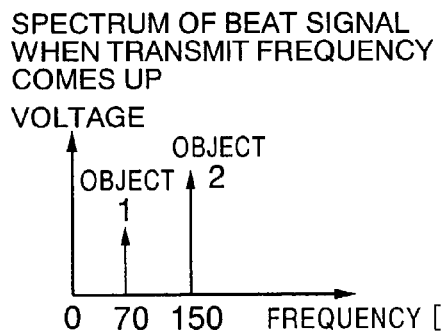
FIGS. 8A and 8B are explanatory diagrams showing an FFT result when two objects are detected in accordance with the first embodiment of the present invention, respectively.
Figure 8B:
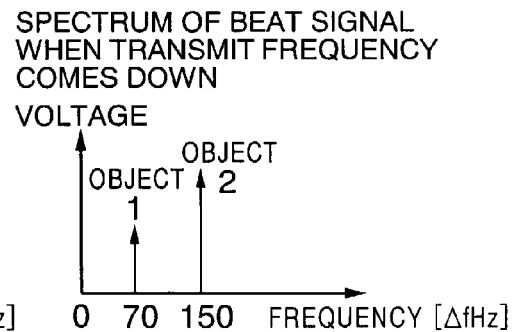

For example, in the case of $\Delta R=1$ m and $\Delta v=1$ km/h, when two objects, that is, an object D of R=70 m and v=0 km/h and an object E of R=150 m and v=0 km/h exist, the vehicle-mounted radar device according to the above-mentioned first embodiment obtains the calculation result shown in FIGS. 8A and 8B. However, in the vehicle-mounted radar device according to this embodiment, in the case where the range gate width is set to, for example, 30 m, because only the frequency components that appear from the objects which exist within the respective range gate ranges are detected as shown in FIG. 9, the frequency component of the object D appears in only the range gate 3, and the frequency component of the object E appears in only the range gate 5. In the case where the range gate width is set to 30 m, the range gate 1 is 0 to 30 m or less, the range gate 2 is 30 to 60 m or less, the range gate 3 is 60 to 90 m or less, the range gate 4 is 90 to 120 m or less, and the range gate 5 is 120 to 150 m or less. Also, FIGS. 9A and 9B show the FFT result of the object that exists within the distance range corresponding to the range gate 3, FIGS. 9C and 9D show the FFT result of the object that exists within the distance range corresponding to the range gate 5, and FIGS. 9E and 9F show the FFT result of the object that exists within the distance range corresponding to the range gates 1, 2, 4 and so on (that is, except for the range gates 3 and 5).

Subsequently, the aliasing discriminating/correcting means 31 in this embodiment will be described. For example, as in the first embodiment, in the case where the following frequency components are inputted to the aliasing discriminating/correcting means 31, $$Fbu=\Delta F \times 162$$

$$Fbd=\Delta F \times 50$$

the following two kinds of candidates of the distances and relative velocities which are obtained from Fbu and Fbd are considered as described above.

Distance=150 m and relative velocity=200 km, or

Distance=106 m and relative velocity=56 km/h

In the case where the range gate width is set to 30 m, the object of distance=150 m is detected in the range gate 5, and the object of distance=106 m is detected in the range gate 4. It is found from the result of FIG. 9 that the candidate of the distance=150 m and the relative velocity=200 km is correct since the object E is detected in the range gate 5 whereas no object is detected in the range gate 4. The aliasing discriminating/correcting means 31 checks data of which range gate is detected to judge that any one of the candidates is a normal frequency component and outputs only the normal frequency component.

As described above, according to this embodiment, there can be obtained the same advantages as those in the above-mentioned first embodiment. In addition, the FFT calculation results for each of the range gates having the given range gate width are obtained by using the FM pulse Doppler system due to the action of the transmit/receive change-over switch 23, and the aliasing discriminating/correcting means 31 checks that the FFT calculation result is data of which range gate in discriminating the correct candidate among the candidates of the distances and relative velocities which are obtained from the FFT calculation result to discriminate the correct candidate, thereby being capable of correctly detecting the distance and relative velocity of the object.

The present invention relates to a radar device, comprising: a transmitting means for transmitting an electromagnetic wave to a target object; a receiving means for receiving the electromagnetic wave that is transmitted from said transmitting means and reflected by the target object; a mixing means for mixing an output of said transmitting means and an input of said receiving means to generate a beat signal; a low-pass filter that allows a signal having a frequency component that is equal to or lower than a given frequency among the beat signals outputted from said mixing means to pass therethrough; an A/D converting means for sampling an output signal of said low pass filter to convert the sampling signal into a digital signal; a high-speed Fourier transforming means for subjecting the sampling signal that is sampled by said A/D converting means and converted into the digital signal to high-speed Fourier transformation; an aliasing discriminating/correcting means for discriminating a signal having a frequency component where aliasing occurs from the high-speed Fourier transformation result by said high-speed Fourier transformation processing means and for correcting the signal where aliasing occurs to a signal of a normal frequency component having no aliasing to obtain a distance and relative velocity data of the object on the basis of the corrected signal or the signal where no aliasing occurs; and a target object selecting means for selecting necessary data from the distance and relative velocity data of the object which are obtained by said aliasing discriminating/correcting means. Thus, the radar device is capable of accurately detecting even a target object where aliasing occurs.

What is claimed is:

1. A radar device, comprising:
   a transmitting means for transmitting an electromagnetic wave to a target object;
   a receiving means for receiving the electromagnetic wave that is transmitted from said transmitting means and reflected by the target object;
   a mixing means for mixing an output of said transmitting means and an input of said receiving means to generate a beat signal;
   a low-pass filter that allows a signal having a frequency component that is equal to or lower than a given frequency among the beat signals outputted from said mixing means to pass there through;
   an A/D converting means for sampling an output signal of said low pass filter to convert the sampling signal into a digital signal;

a high-speed Fourier transforming means for subjecting the sampling signal that is sampled by said A/D converting means and converted into the digital signal to high-speed Fourier transformation;

an aliasing discriminating/correcting means for discriminating a signal having a frequency component where aliasing occurs from the high-speed Fourier transformation result by said high-speed Fourier transformation processing means and for correcting the signal where aliasing occurs to a signal of a normal frequency component having no aliasing to obtain a distance and relative velocity data of the object on the basis of the corrected signal or the signal where no aliasing occurs; and a target object selecting means for selecting necessary data from the distance and relative velocity data of the object which are obtained by said aliasing discriminating/correcting means, wherein said aliasing discriminating/correcting means discriminates a normal distance and relative velocity data where no aliasing occurs from said candidates on the basis of a change in a frequency component of the high-speed Fourier transformation result with time when there are a plurality of candidates of the distance and relative velocity data of the object which are obtained from the high-speed Fourier transformation result.

2. The radar device as claimed in claim 1, wherein said receiving means comprises only one antenna.

3. The radar device as claimed in claim 1, wherein neither said transmitting means nor said receiving means comprises an array antenna.

4. A radar device, comprising:
a transmitting means for transmitting an electromagnetic wave to a target object;
a receiving means for receiving the electromagnetic wave that is transmitted from said transmitting means and reflected by the target object;
a mixing means for mixing an output of said transmitting means and an input of said receiving means to generate a beat signal;
a low-pass filter that allows a signal having a frequency component that is equal to or lower than a given frequency among the beat signals outputted from said mixing means to pass there through;
an A/D converting means for sampling an output signal of said low pass filter to convert the sampling signal into a digital signal;
a high-speed Fourier transforming means for subjecting the sampling signal that is sampled by said A/D converting means and converted into the digital signal to high-speed Fourier transformation;
an aliasing discriminating/correcting means for discriminating a signal having a frequency component where aliasing occurs from the high-speed Fourier transformation result by said high-speed Fourier transformation processing means and for correcting the signal where aliasing occurs to a signal of a normal frequency component having no aliasing to obtain a distance and relative velocity data of the object on the basis of the corrected signal or the signal where no aliasing occurs; and
a target object selecting means for selecting necessary data from the distance and relative velocity data of the object which are obtained by said aliasing discriminating/correcting means,
wherein said high-speed Fourier transforming means outputs the high-speed Fourier conversion result obtained by subjecting the sampling signal to high-speed Fourier transformation for each of the range gates each having a given range gate width, and
wherein said aliasing discriminating/correcting means refers to a fact that the high-speed Fourier transformation result is derived from the sampling data of which range gate, and discriminates a normal distance and relative velocity data where no aliasing occurs from the candidates on the basis of the reference result when a plurality of candidates of the distance and relative velocity data of the object are obtained from the high-speed Fourier transformation result.

* * * * *